Jan. 14, 1936.  A. M. JORALEMON ET AL  2,027,536
ARTICULATED DISPLAY
Filed Oct. 4, 1933   2 Sheets-Sheet 1

INVENTORS
ALEXANDER M. JORALEMON
AND AUBREY W. VAUGHAN
BY
ATTORNEY

Jan. 14, 1936.  A. M. JORALEMON ET AL  2,027,536
ARTICULATED DISPLAY
Filed Oct. 4, 1933   2 Sheets-Sheet 2

INVENTORS
ALEXANDER M. JORALEMON
AND AUBREY W. VAUGHAN
BY
ATTORNEY

Patented Jan. 14, 1936

2,027,536

UNITED STATES PATENT OFFICE 2,027,536

ARTICULATED DISPLAY

Alexander M. Joralemon, Newark, N. J., and Aubrey W. Vaughan, Cleveland, Ohio, assignors to National Carbon Company, Inc., a corporation of New York Application October 4, 1933, Serial No. 692,164

13 Claims. (Cl. 40—126)

The invention pertains in general to advertising devices or display material and in particular to an articulated display device consisting of a plurality of aligned dummy cartons or containers for a salable product secured together by hinges or articulated joints so that the display may be shipped as a unit and then formed by a user or decorator into a variety of shapes or forms suitable for the type of display or trim desired.

Heretofore devices of this type have been formed of disconnected units or cartons which required considerable time and some ingenuity to assemble them into a satisfactory display, or of a relatively rigid structure adapted to be displayed in some particular predetermined form. These prior devices lack the convenience of a unitary structure and the adaptability of an articulated structure. Therefore, one of the objects of this invention is to provide an articulated display device comprising a plurality of cartons or containers, such as dummy cartons, joined by articulated joints or hinges, so that the device may be formed or arranged into various shapes or forms according to the character of display or trim desired and the size and shape of the space available.

This and other objects and novel features will be more fully described and disclosed by the following specification and the accompanying drawings, in which.

Broadly, an embodiment of the invention consists of an articulated display device comprising a plurality of aligned cartons or cases joined by articulated joints or hinges. The cartons or cases may be those in which a product is shipped and sold or they may be dummy cartons or cases that simulate the genuine.

The cases or cartons comprising the display may be joined along either a vertical or a horizontal line, or the display may comprise a plurality of axially aligned cases or cartons joined into rigid stacks, and a plurality of such stacks joined in lateral alignment by articulated joints, or hinges. Also, each stack may comprise a single form, tube or support covered by a plurality of identical labels or other printed matter to simulate a stack of cartons, cases, or the like.

The cartons or cases may be of different shapes, such as cylindrical, square, or rectangular, and the movable joints may be of any appropriate type such as hinges secured to the ends of the cartons or stacks, or pliable strips secured to adjacent cartons or stacks.

One example of an embodiment of the invention consists of an articulated display device comprising a plurality of stacks 10 each comprising a plurality of cartons or cases rigidly united by suitable means such as an adhesive, interlocking joints, or eyelets, or a form or support of suitable material such as paper or pulpboard covered by a plurality of labels or other printed matter to simulate a stack of cartons or cases.

Figure 1:
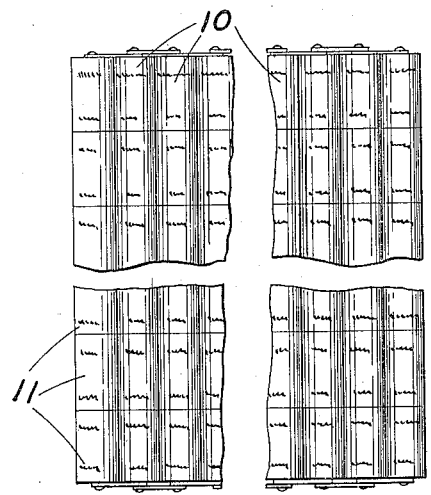
Fig. 1 is a front view of an articulated display device embodying the invention.

The particular stacks 10 shown in Fig. 1, as an example, each comprises a hollow cylindrical tube of pulpboard or similar material, such as that used to cover or encase dry batteries, and especially flashlight batteries, covered by a plurality of labels, such as those used on cases for flashlight batteries, so that each stack has the appearance of a stack of flashlight batteries.

The stacks 10 are joined by movable joints or hinges of any suitable type to form an articulated display device of suitable shape, such as rectangular, that may be formed into a display of cylindrical or angular form that is self-supporting or one that conforms in shape to a flat, curved, or angular surface.

Figure 2:
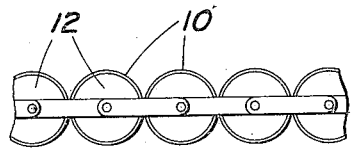
Figs. 2 and 3 are fragmentary end and sectional views showing one means of joining the hollow cylindrical cartons or cases of the display device shown in Fig. 1.
Figure 3:
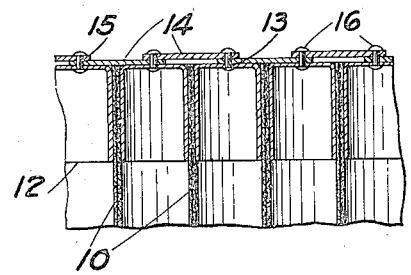

One example of suitable means for joining the stacks 10 is shown in Figs. 2 and 3, which comprises a closure such as a cup 12, for example an empty battery cup or container, in each end of each stack or tube 10. The bottom of each cup 12 is provided with an opening 13, preferably at the center thereof, and the cup in each stack is joined to the cup in each adjacent stack by rigid connections or spacing members such as metal links 14 each having an opening 15 in each end by which it is secured or attached to a cup 12 by suitable attaching means such as a hinge pin, bolt, rivet, or eyelet 16 that fits loosely in the openings 13 and 15 so that the links 14 are movable with respect to the cup 12 and form articulated joints or hinges each having a part, such as a hinge pin 16, joined to each stack so that an articulated display device is produced. One advantage in this means of joining the stacks is that each stack may be rotated independently so that any particular portion of the labels on the stacks may be faced in any direction desirable to produce a particular display or effect.

Figure 4:
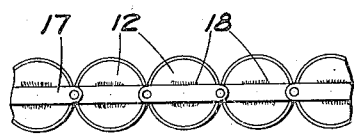
Figs. 4 and 5 are similar views showing another means of joining the cases or cartons shown in Fig. 1.
Figure 5:
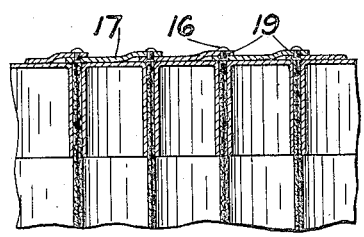

Another example of suitable means for connecting the stacks 10 is shown in Figs. 4 and 5 in which a portion of an articulated joint, such as a link 17, is rigidly secured to each can 12 by suitable means, such as rivets, eyelets, or a joint of solder 18, and the overlapping ends of the links secured to adjacent stacks are provided with aligned openings 19 at the abutting peripheries of adjacent stacks in which a suitable connection, such as a hinge pin, rivet or eyelet 16 loosely fits so that an articulated display device is produced. One advantage of this means of connecting the ends of the stacks is that each stack is not rotatable independently and therefore a predetermined relative arrangement is maintained during use.

Figure 6:
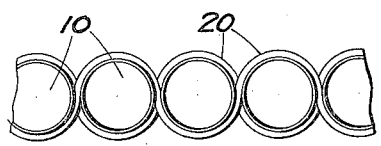
Figs. 6 and 7 are similar views showing another means of joining the cases shown in Fig. 1.
Figure 7:
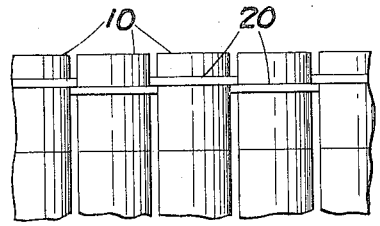

Another example of suitable means for connecting the stacks is shown in Figs. 6 and 7 in which a flexible member, such as a wire or cord 20, is woven around opposite sides of adjacent stacks 10 and the same or another similar cord or wire is woven around the opposite side of each stack from the first, so that the two strands of the cord 20 across between adjacent stacks and each stack is held between two strands of cord 20 similar to the way woof is held by the warp in weaving.

Figure 8:
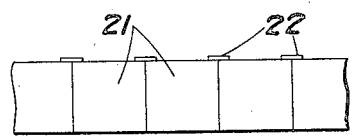
Figs. 8 and 9 are similar views showing a means of joining square or rectangular cartons into an articulated display similar to that shown in Fig. 1.
Figure 9:
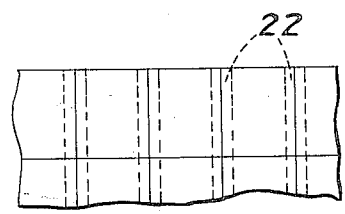

Square or rectangular cartons 21 may also be joined to effect an articulated display device by securing a pliable material, such as paper or fabric, or strips 22 of such material over the joint between adjacent cartons or stacks of such cartons, as shown in Figs. 8 and 9, by suitable binder, such as an adhesive. The strips 22 may be applied over either the vertical or horizontal joints between the cartons to effect a display device that is articulated either horizontally or vertically according to the type of display or trim desired.

Figure 10:
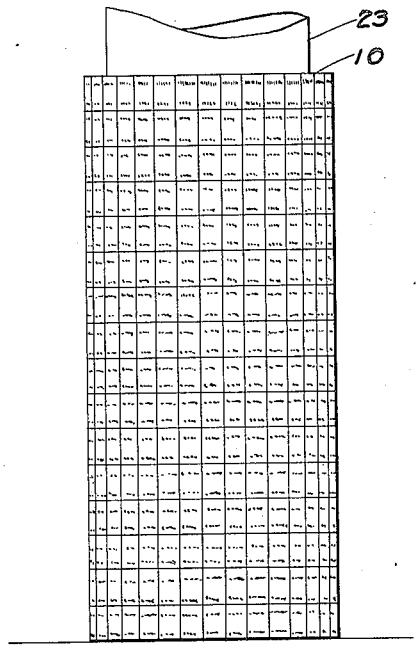
Fig. 10 is a front view of the display shown in Fig. 1 formed around a column.
Figure 11:
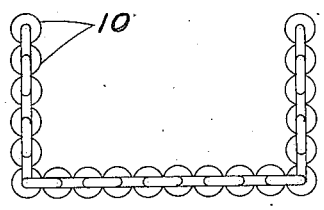
Figs. 11 and 12 are top views showing the device of Fig. 1 formed into self-supporting or standing displays.
Figure 12:
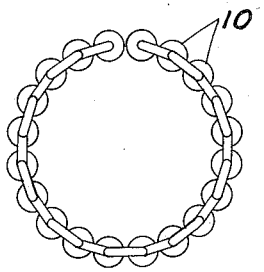
Figure 13:
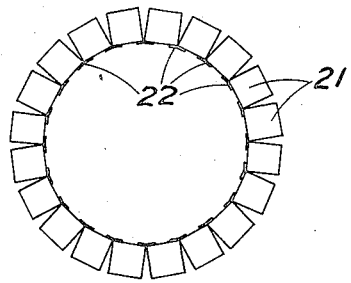
Fig. 13 shows the device of Figs. 8 and 9 formed into a self-supporting standing display.
Figure 14:
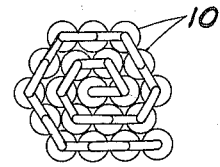
Fig. 14 shows the display of Fig. 1, rolled for shipment.

This articulated device provides a unitary display that may be rolled into a compact bundle for shipment, as shown by Fig. 14, and then quickly and easily formed into a self-supporting unitary display of various shapes or forms at the place of use. For example, the device may be formed into a flat or plane display as shown in Fig. 1 that may be placed against a flat wall or other support. Also, the device may be formed around a round column 23 as shown in Fig. 10, or around or to a column or surface of other shape. Furthermore, the device may be formed into circular, angular, or other shapes, as shown in Figs. 11, 12 and 13, which will stand without support and form displays of various kinds. It is obvious, of course, that the device may be formed into displays of other kinds and that it may be disposed either horizontally, vertically, or in any other position.

It is also understood that the stacks may be formed in other well known ways and that various equivalent and similar devices may be used to connect the stacks without departing from the range of the invention or the scope of the claims.

We claim:—

1. An articulated display comprising a plurality of containers in linear alignment and means comprising a rigid spacing member provided with a movable joint connecting each container to the next in line.

2. An articulated display comprising a plurality of aligned stacks with a plurality of aligned containers in each stack; means rigidly joining each container in each stack to the next in line; and means comprising a plurality of links each secured to two stacks for joining each stack to the next in line.

3. An articulated display comprising a plurality of aligned tubes each simulating a stack of containers, and means comprising a plurality of articulated spacing members for joining said tubes in lateral relation.

4. An articulated display comprising a plurality of aligned tubes; a plurality of labels on each tube to simulate a stack of containers; a closure in each end of each tube provided with an opening; a plurality of links each having an opening in each end in alignment with the opening in one of said closures; and a hinge pin in the aligned openings in each closure and link.

5. An articulated display comprising a plurality of aligned tubular forms; a plurality of identical labels on each form; a cup having an opening in the bottom thereof in each end of each form; a plurality of spacing members each having an opening in each end in alignment with the opening in one of said cups and one opening in another of said spacing members; and a rivet in each of said groups of aligned openings.

6. An articulated display comprising a plurality of aligned tubular supports; a closure in each end of each of said supports; a link secured to each of said closures and provided with an opening in each end at the periphery of the support to which it is secured and in alignment with one opening in the link secured to an adjacent support; and a hinge pin in the aligned openings in the adjacent ends of the links secured to adjacent supports.

7. An articulated display comprising a plurality of aligned supports, and means for securing each support to the next in line comprising a plurality of joined spacing members having an articulated joint at the axis of each support.

8. An articulated display comprising a plurality of aligned supports, and means for connecting said supports comprising a plurality of joined spacing members having an articulated joint at the periphery of each support.

9. An articulated display comprising a plurality of laterally aligned supports each simulating a plurality of axially aligned containers; a line of connected hinges at each end of said supports; and a closure in each end of each support secured to a hinge pin of one of said lines of hinges.

10. An articulated display comprising a plurality of laterally aligned supports each simulating a plurality of axially aligned containers; a plurality of connected articulated joints; and means securing a portion of each joint to one end of each of said supports.

11. An articulated display comprising the combination of a plurality of laterally aligned stacks of axially aligned dummy cartons or containers, and means comprising a serial line of articulated spacing members for securing each stack to the next in line.

12. An articulated display comprising the combination of a plurality of aligned stacks of rigidly joined dummy cartons or containers, and means comprising articulated spacing links for joining each end of each stack to the adjacent end of each adjacent stack.

13. An article of manufacture consisting of an articulated display comprising a group of laterally aligned units each simulating a stack of axially aligned cartons or containers, and means comprising a plurality of connected articulated joints secured to each end of said group of units.

ALEXANDER M. JORALEMON.
AUBREY W. VAUGHAN.